(12) United States Patent
Choo

(10) Patent No.: US 6,462,343 B1
(45) Date of Patent: Oct. 8, 2002

(54) SYSTEM AND METHOD OF PROVIDING IMPROVED CD-SEM PATTERN RECOGNITION OF STRUCTURES WITH VARIABLE CONTRAST

(75) Inventor: Bryan K. Choo, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/768,081

(22) Filed: Jan. 23, 2001

Related U.S. Application Data

(60) Provisional application No. 60/243,316, filed on Oct. 26, 2000.

(51) Int. Cl.⁷ .............................................. G01T 1/24
(52) U.S. Cl. .............................. 250/370.08; 438/14
(58) Field of Search ........................... 438/14; 356/401; 250/307, 497.21, 309

(56) References Cited

U.S. PATENT DOCUMENTS 5,518,579 A    5/1996  Katsuyama et al.
6,258,610 B1 * 7/2001  Baltchford ................... 438/14

* cited by examiner

Primary Examiner—John F. Niebling
Assistant Examiner—Andr' C Stevenson
(74) Attorney, Agent, or Firm—Eschweiler & Associates, LLC

(57) ABSTRACT

A system for determining a shape of a feature is provided. The system includes an analysis system providing a signal corresponding to a scan of a portion of a surface of the feature and a stored signal corresponding to a portion of a profile of a similar feature, wherein the profile may have differing contrast levels than scanned portion of the surface of the feature. A processing system is operatively coupled to the analysis system, wherein the processing system is configured to determine the shape of the feature by positioning the signal corresponding to the surface of the feature relative to the stored signal and comparing for regions of substantially constant contrast between the two signals.

11 Claims, 7 Drawing Sheets

SYSTEM AND METHOD OF PROVIDING IMPROVED CD-SEM PATTERN RECOGNITION OF STRUCTURES WITH VARIABLE CONTRAST

This application claims the benefit of provisional application 60/243,316 filed on Oct. 26, 2000.

FIELD OF THE INVENTION

The present invention relates generally to semiconductor processing, and in particular to a system and method for determining shapes of features having variable contrast resulting from a semiconductor manufacturing process.

BACKGROUND OF THE INVENTION

In the semiconductor industry, there is a continuing trend toward higher device densities. To achieve these high densities there has been and continues to be efforts toward scaling down the device dimensions (e.g., at submicron levels) on semiconductor wafers. In order to accomplish such high device packing density, smaller and smaller features sizes are required. This may include the width and spacing of interconnecting lines, spacing and diameter of contact holes, and the surface geometry such as corners and edges of various features.

The requirement of small features with close spacing between adjacent features requires high resolution photolithographic processes. In general, lithography refers to processes for pattern transfer between various media. It is a technique used for integrated circuit fabrication in which a silicon slice, the wafer, is coated uniformly with a radiation-sensitive film, the resist, and an exposing source (such as optical light, x-rays, etc.) illuminates selected areas of the surface through an intervening master template, the mask, for a particular pattern. The lithographic coating is generally a radiation-sensitive coating suitable for receiving a projected image of the subject pattern. Once the image is projected, it is indelibly formed in the coating. The projected image may be either a negative or a positive image of the subject pattern. Exposure of the coating through a photomask causes the image area to become either more or less soluble (depending on the coating) in a particular solvent developer. The more soluble areas are removed in the developing process to leave the pattern image in the coating as less soluble polymer.

Due to the extremely fine patterns which are exposed on the photoresist, Scanning Electron Microscopes (SEMS) may be employed to analyze and measure critical dimensions resulting from the lithographic process. Critical dimensions may include the size of minimum features across the wafer such as linewidth, spacing, and contact dimensions, for example. Analytical portions within the SEMs may then utilize pattern recognition algorithms to determine the feature's shape wherein scanned features may be compared to stored predetermined patterns. Unfortunately, conventional pattern recognition systems often fail to correctly identify scanned features.

One such problem associated with a conventional pattern recognition method relates to correctly identifying features that may have varying contrast levels even though a pattern may be the same from one brightness level to the next. For example, pattern features, such as contact holes, may have opposite contrast levels depending on the actual wafer layer currently being scanned. Conventional pattern recognition systems often employ pixel comparison algorithms to identify such features, for example. This may involve storing a set of pixels in memory for each of a plurality of desired or expected feature profiles/templates. Under ideal circumstances, as actual semiconductor features are scanned by the SEM system, a memory pixel comparison is performed between the scanned feature and the stored feature. If enough pixels match between one of the stored profiles and the scanned feature profile, an identification of the feature is then determined based upon the match.

If, however, the feature being analyzed is scanned over multiple layers for example, pixel contrast levels/values will likely change for the scanned feature depending on the layer scanned. As features are scanned over multiple layers, it is noted that different layers can correspond to different substrates and materials. Thus, contrast levels/values can change. Unfortunately, the stored feature profiles described above are often stored with an absolute pixel value corresponding to a static and/or fixed value for the feature. When a similar feature is scanned having differing pixel contrast values than the stored profiles, a mismatch is likely to occur between the stored profile and the scanned feature based upon conventional pixel comparison algorithms. This may result in an incorrect identification of the feature since none of the stored profiles may match the scanned feature profile. Thus, an acceptable feature may be incorrectly rejected merely by having differing pixel contrast values than the stored feature profile. Consequently, there is a need for a system and/or method which improves feature pattern recognition across varying contrast levels.

SUMMARY OF THE INVENTION

The present invention relates to a system and method for improving feature pattern recognition within SEM systems. A plurality of signal scans may be provided by an SEM system during critical dimension measurements which may then be utilized by the SEM and/or other computer systems to determine the feature's shape. In contrast to conventional pixel comparison systems wherein features are determined by matching scanned pixels with stored absolute value pixel profiles, the present invention employs a signal analysis despite varying contrast levels of the scanned feature to identify the shape. This may be achieved by determining a first set of signal contrast regions of a stored feature profile and comparing those regions to second set of signal contrast regions from the scanned feature. If the compared contrast regions have substantially constant brightness at the defined regions, it may be determined that the features are the same. In this manner, features may be determined across multiple layers of a structure even though contrast levels differ amongst the layers. Thus, feature misidentifications associated with conventional systems are mitigated.

More particularly, the present invention employs an SEM scan analysis and comparison algorithm to perform pattern recognition of features having variable contrast. Pattern recognition is achieved by performing an alignment and a contrast analysis between a signal associated with a stored feature and a signal received from the SEM system. The SEM signal may be provided, for example, by performing an SEM scan across the feature. Alignment of the scanned signal and the stored signal may then be achieved by positioning edges of each signal in a defined relationship with each other. After signal alignment, the contrast analysis is performed on a set of regions defined by varying contrast levels of the scanned signals. As regions of the signals are analyzed, a determination is made as to whether the brightness level is substantially constant (e.g., within a predetermined threshold of variation) across the regions. If the scanned contrast regions having substantially constant brightness correspond to the stored profile regions having substantially constant brightness, the feature's shape may be determined despite the varying contrast levels.

To the accomplishment of the foregoing and related ends, the invention comprises the features hereinafter fully described. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1a is a diagram illustrating a scan and signal pattern of similar features having differing contrast levels in accordance with an aspect of the present invention;

DETAILED DESCRIPTION OF THE INVENTION

Figure 1B:
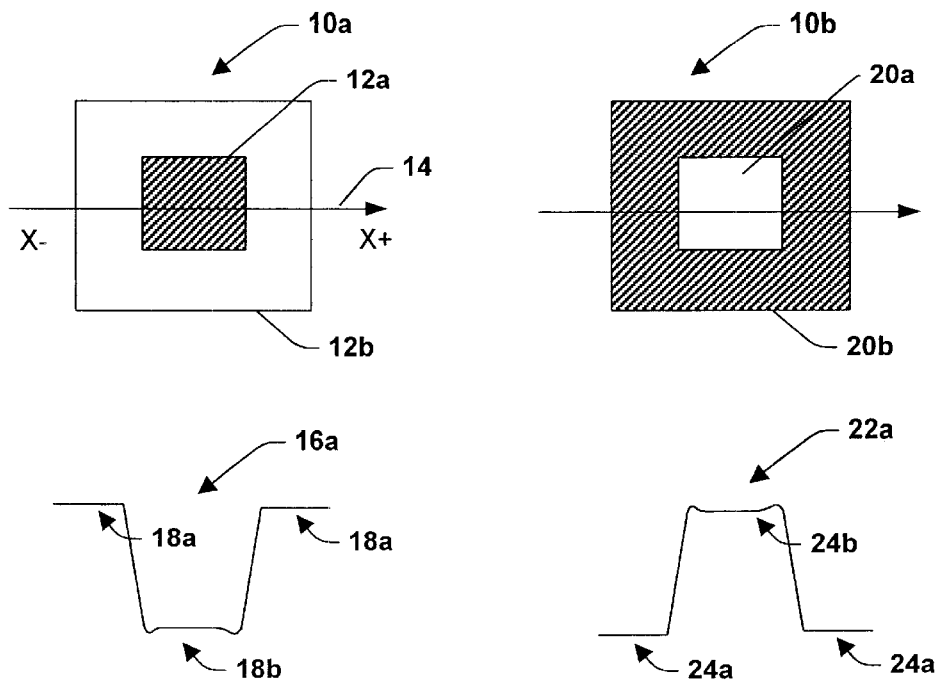
FIG. 1b is an overlay diagram depicting a relationship between the scan and signals of FIG. 1a in accordance with an aspect of the present invention.
Figure 1B:
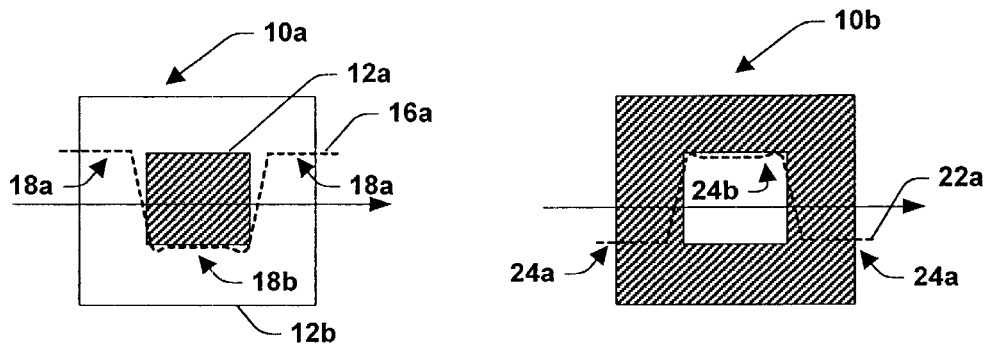

The present invention will now be described with reference to the drawings, wherein like reference numerals are used to refer to like elements throughout.

The present invention relates to a system and methodology for improved pattern recognition of a feature. In accordance with the present invention, a signal is generated as a feature is scanned by a CD-SEM system and compared with a stored signal profile. The scanned signal may have brightness levels with varying degrees of contrast than the stored signal profile. The scanned signal and stored signal are aligned in relation to each other and a determination is made as to whether the aligned signals have corresponding areas of substantially constant brightness. If the constant brightness areas of the scanned signal correspond to the constant contrast brightness areas of the stored signal, the scanned feature may be identified as having a similar structure to the stored signal profile of the feature—regardless of the contrast differences between the scanned feature and stored profile. In this manner, problems associated with conventional pixel comparison algorithms are mitigated.

The system may be implemented in a software system as part of a critical dimension scanning electron microscope (CD-SEM). Although the present invention is described in reference to a CD-SEM system, it is to be appreciated that the system and methodology described below may be applied to substantially any analytical system providing a signal based on the geometry and/or topology of the surface being measured.

Referring initially to FIG. 1a, a top plan view of two exemplary features 10a and 10b illustrate an aspect of the present invention relating to pattern recognition of variable contrast features. For example, the feature 10a depicts a pattern having contrast regions 12a and 12b, wherein the feature 10b represents a similar pattern of a previously scanned and/or stored feature having different contrast levels. A scan line 14 is depicted as traversing the feature 10a in the X+ direction wherein a correlating signal 16a is provided. It is to be appreciated that other scan directions may be selected. The signal 16a is a function of the brightness levels associated with the contrast regions 12a and 12b. For example, an area 18a of signal 16a corresponds to the contrast region 12a and an area 18b of signal 16a corresponds to the contrast region 12b.

The feature 10b represents a previously scanned feature having contrast regions 20a and 20b. As illustrated, the feature 10b may be scanned from a differing layer than the feature 10a thereby causing the region 20a to be lighter than region 12a and region 20b to be darker than region 12b, for example. A stored signal 22a having areas 24a and 24b corresponds to the feature 10b. As will be described in more detail below, the present invention enables pattern recognition by aligning the signals 16a and 22a, and determining if the signal areas 18a and 18b correspond to the signal areas 24a and 24b. This may be achieved for example, by determining if the signal areas 18a and 18b have substantially constant brightness (e.g., below a predetermined threshold of variance) at similar areas of constant brightness to the stored signal 22a at areas 24a and 24b.

Referring now to FIG. 1b, the signals 16a and 22a are depicted as an overlay to the features 10a and 10b in order to illustrate the relationship between the signals and the features. For example, during the scan of the lighter region 12b, the signal 16a has corresponding brightness levels at areas 18a. During the scan of the darker region 12b, the signal 16a has a lower brightness value at area 18b. The feature 10b may be similarly analyzed wherein the lighter region 20a is associated with the brightness level 24b and the darker region 20b is associated with the brightness levels at signal areas 24a.

It is noted that at the darker or lighter regions of the features 10a and 10b that the brightness level is substantially constant. For example, signal areas 18a are at substantially the same level and generally correspond to the brightness of area 12b. The dark portion 12a is also generally a constant brightness level although different from that of region 12b. The feature 10b although having different brightness levels than the feature 10a, provides similar areas of constant brightness as depicted at signal areas 24a and 24b. By determining if constant brightness areas 18a and 18b of the scanned signal 16a have corresponding constant brightness areas 24a and 24b of the stored signal 22a, the present invention may identify the scanned feature 10a even though the brightness levels are different than the stored feature profile 10b. It is to be appreciated that the present invention may identify patterns having opposite contrast levels, the same contrast levels and/or differing contrast levels wherein there may only be slight differences between the scanned feature and the stored feature.

Figure 2A:
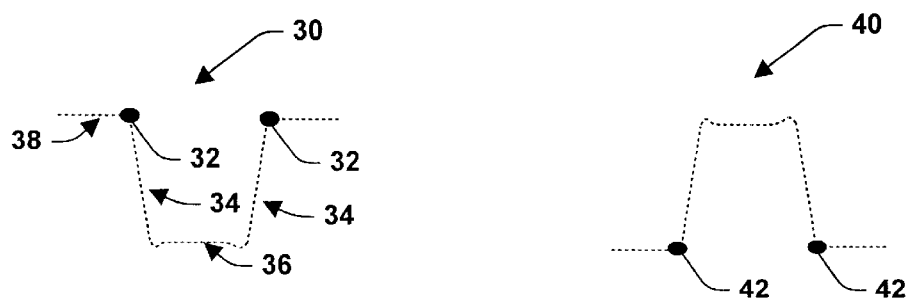
FIG. 2a is a diagram depicting signal edge determinations in accordance with an aspect of the present invention.
Figure 2B:
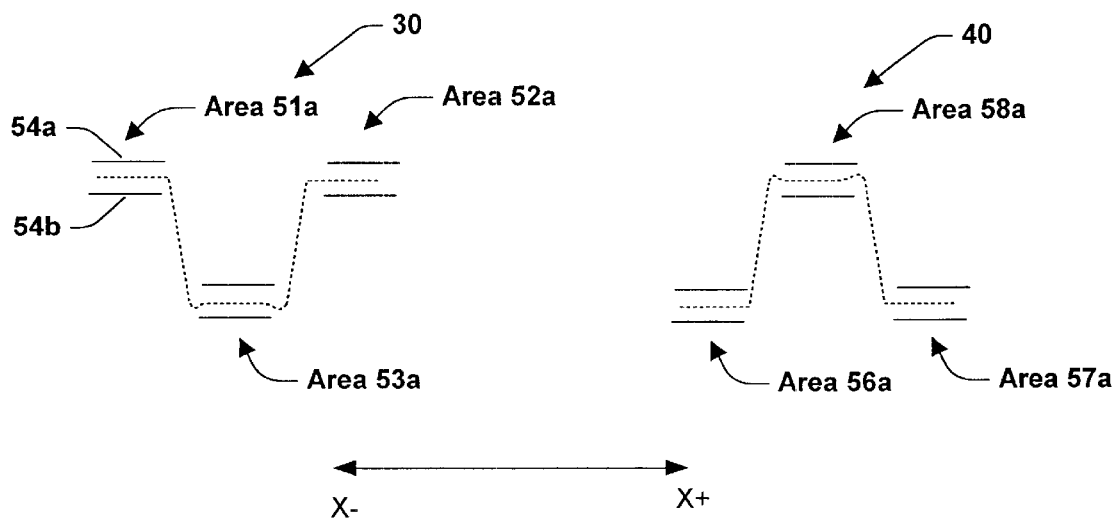
FIG. 2b is a diagram illustrating constant contrast area determinations of a scanned signal from a feature in accordance with an aspect of the present invention.

Turning now to FIGS. 2a and 2b, a signal analysis for the signals 16a and 22a of FIG. 1a is provided in accordance with the present invention. FIG. 2a represents an edge determination and FIG. 2b represents a signal area determination. The signal edges define the potential areas of constant contrast for the signals 16a and 22a. After the signal edges and areas have been determined, a determination is made as to whether constant contrast areas of signal 16a correspond to the constant contrast areas of signal 22a.

Referring to FIG. 2a, a digital data representation of signal 16a is depicted at reference numeral 30. When the signal 16a is digitized as will be described in more detail below, reference points 32 may be determined from data bits 34 which are stored in memory locations (described below) and represent the digitized signal 30. The reference points 32 may be determined, for example, by examining the stored memory locations to determine when the digitized data 30 transitions from one state to the next (e.g., high-to-low, low-to-high). For example, a low state is depicted at reference 36 and a high state is depicted at reference 38. By determining (e.g., counting bits 34) how many data bits are stored between reference points 32, a determination can be made as to the width of the signal 16a, for example. It is to be appreciated that the reference points 32 illustrate an example of where the reference points may be positioned on the signal 30; Other reference points on the signal 30 may be selected. The signal 22a which has been previously scanned is similarly digitized as described above and is illustrated at reference numeral 40 with reference points 42 determined at the transition regions of the signal 22a.

Referring now to FIG. 2b, constant brightness areas are defined for the digitized signals illustrated in FIG. 2a. For example, an area 51a and 52a may be defined at high signal regions 38, and an area 53a is defined at region 36 of the digitized signal 30. The areas 51a and 52a are determined at opposite directions of the reference points 32 and at non-transition portions of the signal 30 whereas area 53a may be determined between the reference points 32. For example, area 51a may be determined in the X– direction by whether the digitized portion of signal 30 falls within a predetermined threshold of variance which is illustrated at references 54a and 54b. Variance may be determined by defining a predetermined amount of change between adjacent bit values within the threshold region 54a and 54b, for example. As an example, if all bit values within area 51a were within 5 counts of each other, a determination that area 51a was of substantially constant brightness may be made. Areas 52a and 53a are also similarly analyzed for substantially constant brightness. Digitized signal 40 may be similarly analyzed at areas 56a through 58a.

Figure 3:
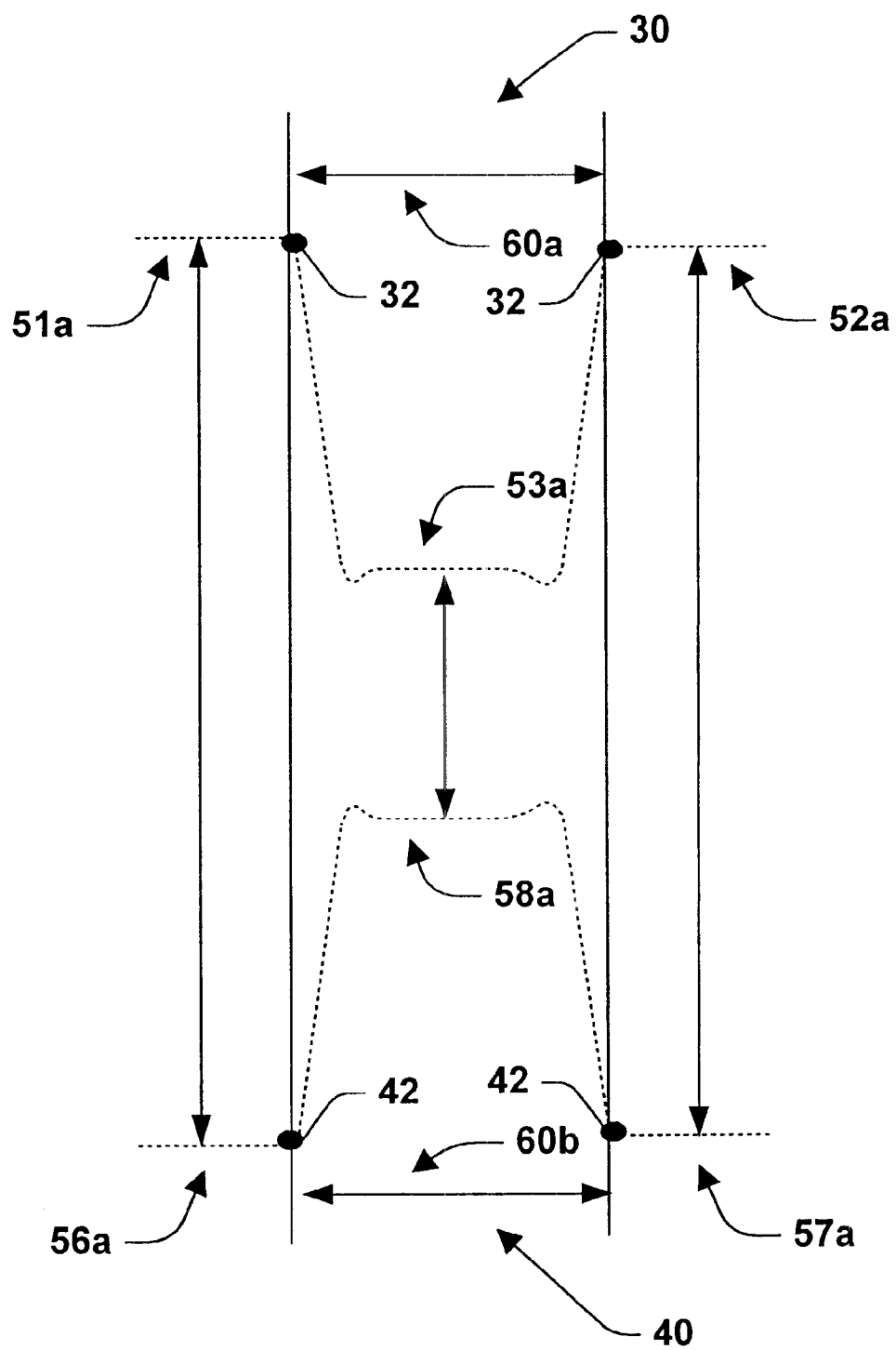
FIG. 3 is a diagram illustrating an alignment and signal comparison in accordance with an aspect of the present invention.

Turning now to FIG. 3, a signal alignment and constant brightness comparison is illustrated in accordance with an aspect of the present invention for determining shapes of varying contrast. The digitized signals 30 and 40 may be aligned via reference points 32 and 42. For example, the alignment may occur in regard to bit address locations within the CD-SEM system and memory described below. Upon aligning the signals 30 and 40, signal widths 60a and 60b may be determined by counting bit locations between the reference points as described above.

The signal widths 60a and 60b may be compared to determine if the signal widths are about the same size. For example, if the signal widths 60a and 60b are within 3 bit values of the number of bit locations between reference points 32 and reference points 42, a determination that signals 30 and 40 have similar physical structures may be made. It is to be appreciated that a plurality of scans along differing points of the features 10a and 10b may be directed in order to determine other dimensions of the features.

After the signals 30 and 40 have been aligned, areas 51a–53a of signal 30 are compared to areas 56a–58a of signal 40 to determine if there are corresponding regions of constant brightness. For example, area 51a of signal 30 is compared to area 56a of signal 40. If both areas have substantially constant brightness as described above, a first flag may be set to indicate a constant brightness match between areas 51a and 56a. Similarly, areas 52a and 57a may be compared. If both areas 52a and 57a have substantially constant brightness, a second flag may be set. Areas 53a and 58a may also be compared. If these areas also have constant brightness, a third flag may be set. If the defined constant brightness regions of the scanned signal 30, such as regions 51a and 52a separated by the differing brightness region 53a, correspond to the constant brightness regions of the stored signal 40, such as regions 56a and 57a separated by the differing brightness region 58a, a determination may be made that similar structures were scanned even though the structures had varying degrees of contrast.

Thus, the present invention may recognize features having similar structure with varying degrees of contrast as opposed to conventional pixel pattern recognition systems that may misidentify patterns based upon absolute brightness values of stored pixels. It is to be appreciated that the scan and signal analysis described above may be applied to other signals having a plurality of substantially constant brightness regions. For example, signals having staircase patterns representing multiple changes of contrast across the feature may be similarly analyzed. Although a single scan and associated stored signal comparison is depicted in FIG. 3 for illustrative purposes, it is to be appreciated that a plurality of signals may be stored and compared as sets and/or groupings of signals (e.g., as a two-dimensional image). For example, multiple scans may be generated across a feature wherein the set of signals associated with the scans are thus compared as a set and/or group to another set of stored signal profiles (e.g., four scanned signals compared as a set to a set of four stored signals).

As an alternative aspect of the present invention, a searching algorithm may be employed to detect/match features that are within a field of view of the CD-SEM by comparing brightness/change similarities to the stored feature such as signal 30. For example, a search may be employed wherein signal brightness and change patterns are determined within the given field of view. As an example, a feature search according to signal 30 can be based upon two areas of constant brightness such as 51a, 52a separated be a region of differing constant brightness 53a. If another signal is found within the field of view of the CD-SEM having a similar brightness/change relationship between signal regions, such as signal 40, having two regions of constant brightness 56a, 57a and separated by a region of differing brightness 58a, a match may be determined.

Figure 4:
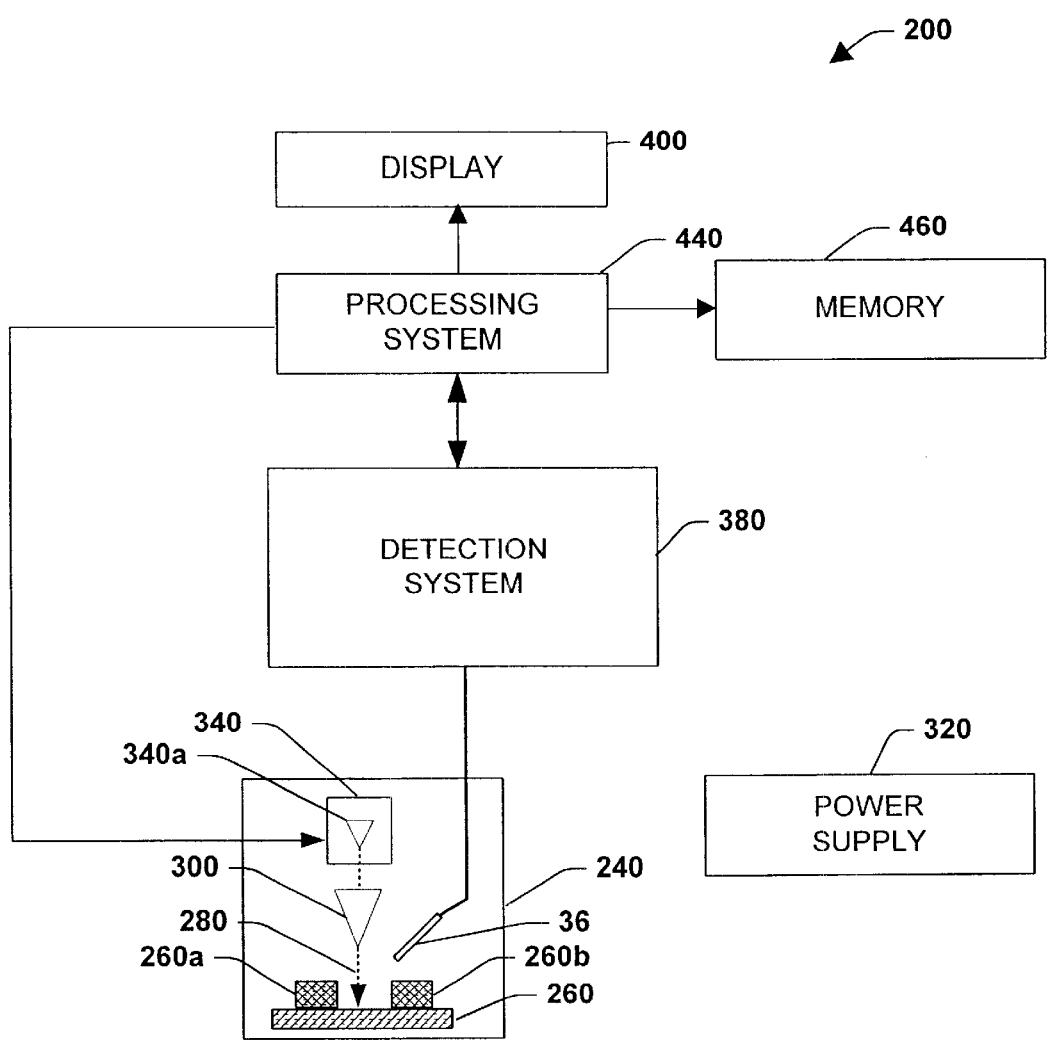
FIG. 4 is a schematic block diagram depicting an SEM system for performing pattern recognition in accordance with an aspect of the present invention.

Now referring to FIG. 4, a CD-SEM system 200 is depicted for providing pattern recognition in accordance with the present invention. The system includes a chamber 240 for housing a wafer 260. An electron beam 280 is directed from an electromagnetic lens 300 toward the wafer 260. The wafer 260 illustrates a cross section of an etched portion of the wafer including two lines 260a and 260b. The electron beam 280 is created from high voltage supplied by a power supply 320 associated with a beam generating system 340 which includes an emission element 340a. Various directing, focusing, and scanning elements (not shown) in the beam generating system 340 guide the electron beam 280 from the emission element 340a to the electromagnetic lens 300. The electron beam particles may be accelerated to energies from about 500 eV to 40 Kev, for example. When the electron beam 280 strikes the surface of the wafer 260, electrons and x-rays are emitted which are detected by a detector 360 and are provided to a detection system 380. The detection system 380 provides digitized detector signals to a processing system 440 for performing conventional critical dimension measurements and signal analysis in accordance with the present invention.

Electrons which are emitted from the surface of the wafer 260 which are most useful for critical dimension imaging are known as secondary electrons and provide a substantial amount of the signal current received by the detector 360. A critical dimension image may also be directed to a display 400 by the processing system 440. The processing system 440, in addition to analyzing data received by the detection system 380, synchronizes the scanning of the display 400 with electron beam scanning of the wafer 260 to provide the image. Contrast of the displayed image is related to variations in the flux of electrons arriving at the detector 360 and is related to the yield of emitted electrons from the surface of the wafer 260 to the incident electrons from the electron beam 280.

The detection system 380 receives the electron emissions from the wafer surface via the detector 360 and preferably digitizes the information for the processing system 440. In addition, the detection system 380 may also provide filtering or other signal processing of the received signal, as described in more detail below. The processing system 440 provides critical dimension information to the display 40 and/or stores information in a memory 460. In accordance with the present invention, the processing system 440 includes a pattern recognition (not shown) and curve fitting software system for determining features such as the lines 260a and 260b. A processor (not shown) is included in the processing system 440 for controlling the beam generating system 340, providing critical dimension measurements, and for performing signal analysis in accordance with the present invention. It is to be appreciated that a plurality of processors and/or processing systems may be included as part of and/or external to the CD-SEM system 200 for performing signal analysis in accordance with the present invention. As described above, signals received from wafer surface measurements are digitized and analyzed as a data set. By analyzing the data, for example, by employing regression mathematics to the data set, a shape for the features 260a and 260b may be determined.

The processor in the processing system 440 is programmed to control and operate the various components within the CD-SEM system 200 in order to carry out the various functions described herein. The processor may be any of a plurality of processors, such as the AMD Athlon, K6 or other type architecture processors. The manner in which the processor may be programmed to carry out the functions relating to the present invention will be readily apparent to those having ordinary skill in the art based on the description provided herein and are omitted herein for the sake of brevity.

A memory 460 is also included in the system 200. The memory 460 is operatively coupled to the processing system 440 and serves to store program code executed by the processor for carrying out operating functions of the system 200 as described herein. The memory 460 also serves as a storage medium for temporarily storing information such as pattern recognition data, curve fitting data, critical dimension data, statistical data, and other data which may be employed in carrying out the present invention.

The power supply 320 also provides operating power to the CD-SEM system 200 along with providing a high voltage to the beam generating system 340. Any suitable power supply (e.g., linear, switching) may be employed to carry out the present invention.

Figure 5:
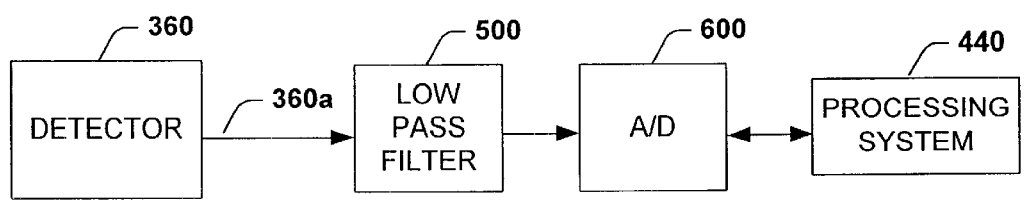
FIG. 5 is more detailed schematic block diagram of a detection system in accordance with an aspect of the present invention.

Now referring to FIG. 5, a more detailed drawing of an exemplary detection system 380 of FIG. 4 is shown. A potentially noisy electrical output signal 360a from the detector is coupled to the input of a low pass filter 500. The low pass filter 500 is shown for illustrative purposes and may be implemented in hardware or as part of a digital low pass filter algorithm in the processing system 440. The signal 360a may need to be smoothed by a low pass filter before subsequent shape analysis occurs by the present invention. An analog to digital (A/D) converter 600, receives the analog signal provided by the detector 360 and/or low pass filter 500 and converts the signal to digital form. The A/D 600 provides binary data to the processing system 440 which performs critical dimension measurements and performs signal analysis in accordance with the present invention.

Figure 6A:
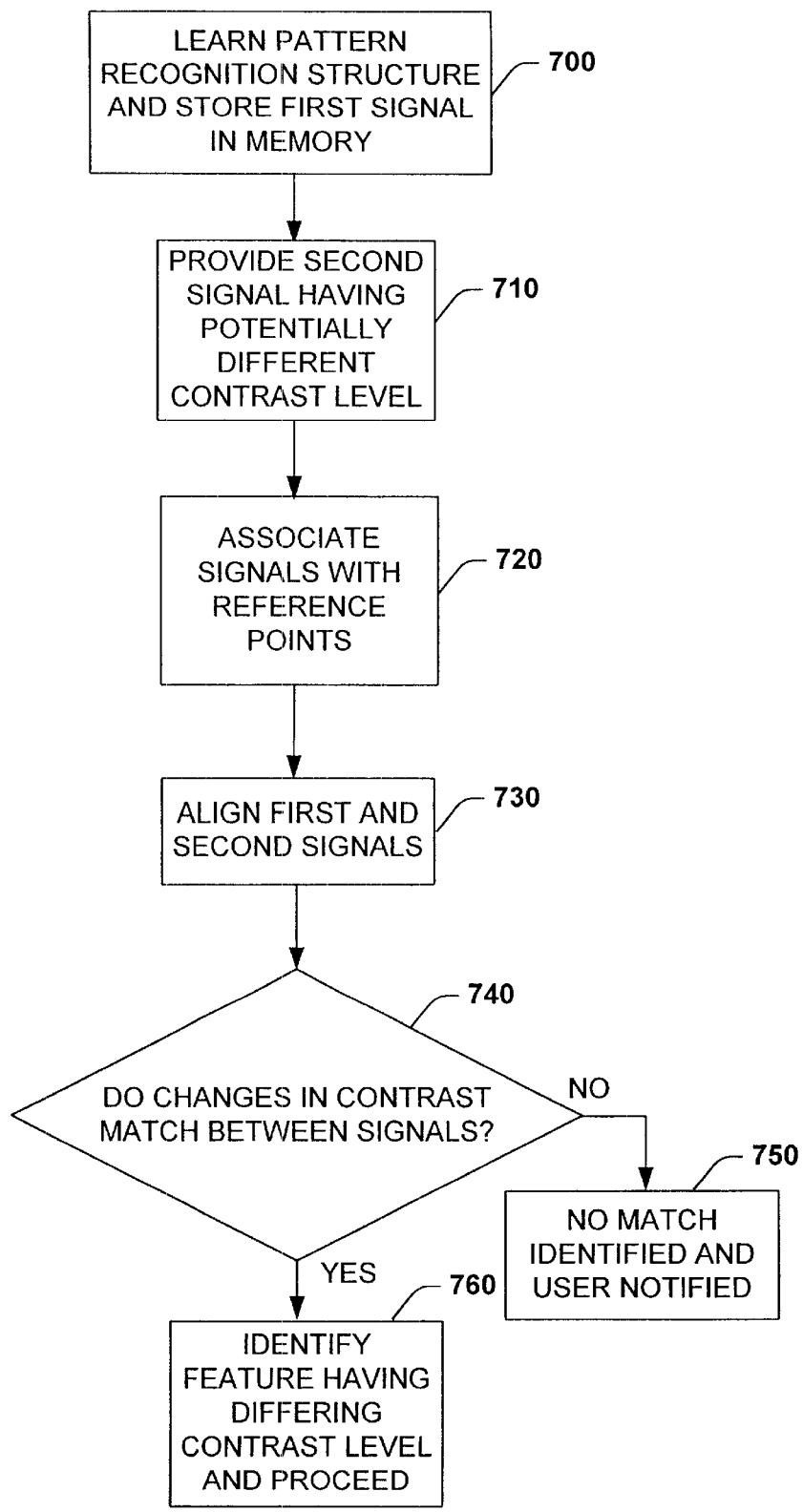
FIG. 6a is a flow chart diagram illustrating a methodology for carrying out one exemplary aspect of the present invention.

Referring now to FIG. 6a, a methodology is provided for recognizing a feature pattern having differing contrast levels in accordance with the present invention. At step 700, a feature/pattern is learned by a CD-SEM system and a first signal is stored as described above. Pattern recognition may be performed in a job set-up stage in which a selected pattern recognition target is stored in memory. Thus step 700 may comprise learning the pattern recognition structure by identifying the selected pattern recognition target that hopefully will match the structure that one is looking for. After a match is found using the methodology, CD measurements of the feature of interest may be made, as may be desired.

At step 710, a second signal from a previously scanned feature having a potentially differing contrast level is stored in the CD-SEM memory. At step 720, at least one reference point is associated with the first and second signals described in steps 700 and 710. The reference points may be determined from the signal transitions as described above, for example. At step 730, the first and second signals are aligned as described above. For example, the signals may be aligned according to the first reference point of each signal. It is to be appreciated that other alignment algorithms may be similarly employed. At step 740, a determination is made as to whether changes in contrast match between the aligned signals. The contrast changes may be determined near the reference points and within a threshold of variation as described above. If the changes in contrast do not match at step 740, the process proceeds to step 750 wherein no match is established between the stored signal and the scanned signal, and a user may be optionally notified. A flag may be set to alert an operator that a match was not found. If all of the changes in contrast match between the first and second signal at step 740, the process proceeds to step 760 and identifies the scanned feature as matching the structure of the stored feature although having potentially differing contrast levels. The process may then proceed to determine other features.

Figure 6B:
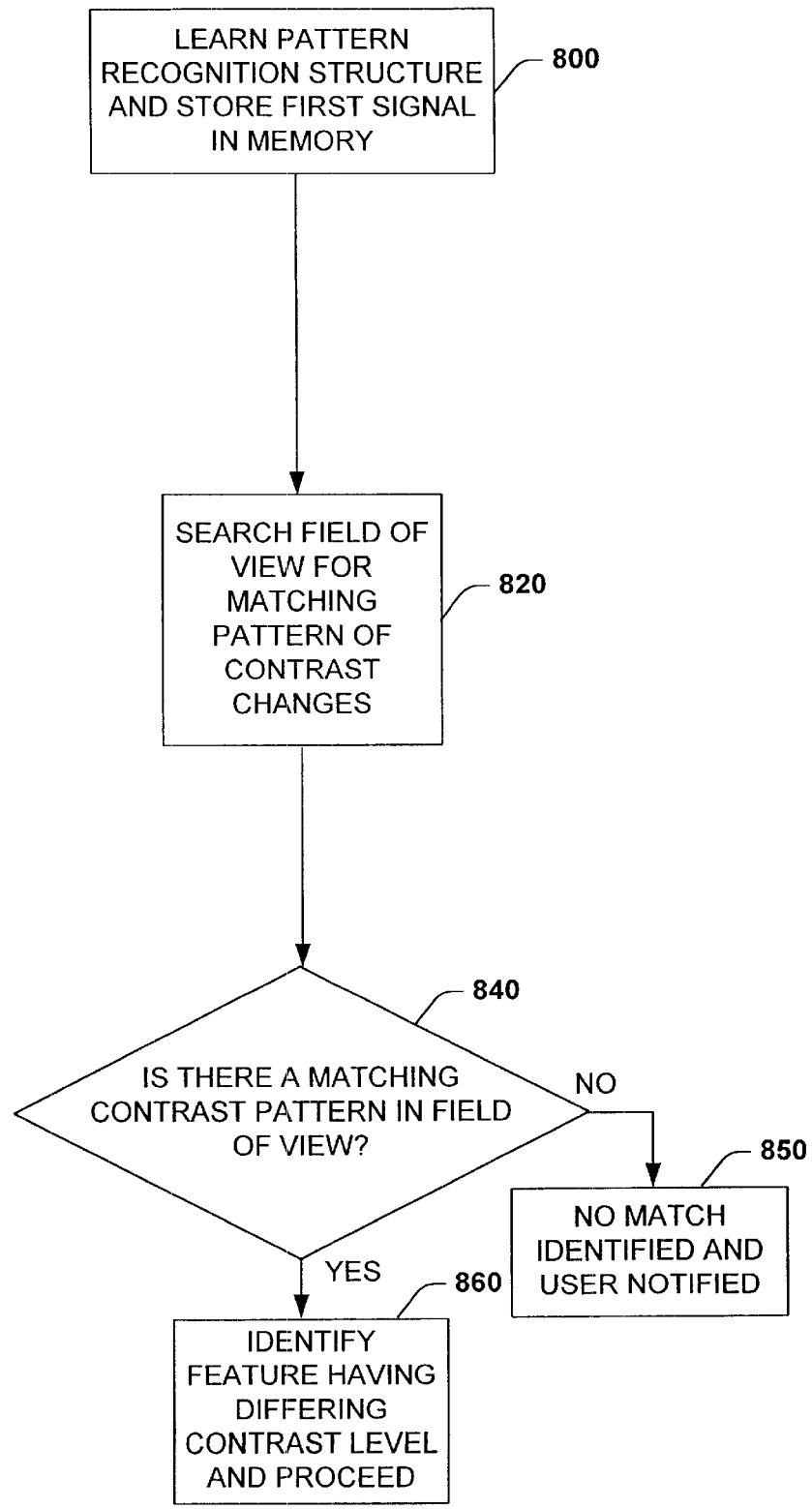
FIG. 6b is a flow chart diagram illustrating an alternative methodology for carrying out one exemplary aspect of the present invention.

Referring now to FIG. 6b, an alternative methodology is provided for recognizing a feature pattern having differing contrast levels in accordance with the present invention. At step 800, a feature/pattern is learned by a CD-SEM system and a first signal is stored as described above. At step 820, a search/scan is conducted within the field of view of the CD-SEM for a signal pattern having similar contrast changes to the signal stored at step 800. At step 840, a determination is made as to whether changes in contrast match between the stored signal and the signals scanned in the field of view at step 820. If the changes in contrast do not match at step 840, the process proceeds to step 850 wherein no match is established between the stored signal and the scanned signal, and a user may be optionally notified. A flag may be set to alert an operator that a match was not found. If all of the changes in contrast match between the stored signal and one of the scanned signals in the field of view at step 840, the process proceeds to step 860 and identifies the scanned feature as matching the structure of the stored feature although potentially having differing contrast levels. The process may then proceed to determine other features.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (ie., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A system for determining a shape of a feature, comprising:
   an analysis system providing a signal corresponding to a scan of a portion of a surface of the feature and a stored signal corresponding to a portion of a profile of a similar feature, wherein the profile may have differing contrast levels than the scanned portion of the surface of the feature; and
   a processing system operatively coupled to the analysis system;
   wherein the processing system is configured to determine the shape of the feature by positioning the signal corresponding to the surface of the feature relative to the stored signal and identifying regions of substantially constant brightness for the signal corresponding to the scanned and the stored signal,
   wherein the processing system is further configured to define a set of reference points for the scanned signal and the stored signal to enable an alignment of the signals, and wherein the set of reference points are determined by the processing system from at least one of a high-to-low and low-to-high signal transition.

2. The system of claim 1 wherein the processing system is further configured to compare the identified regions of substantially constant brightness, and determine the feature shape based on the comparison.

3. The system of claim 1, wherein the analysis system is a CD-SEM.

4. The system of claim 1, wherein the set of reference points are aligned by the processing system via address locations within a memory.

5. The system of claim 1, wherein the reference points are utilized to determine a signal width associated with the scanned and stored signal by counting bit locations between the reference points in order to determine whether the scanned signal is similar in dimension to the stored signal.

6. The system of claim 1, wherein areas of substantially constant brightness are determined by the processing system on the scanned signal and the stored signal near the reference points.

7. The system of claim 6, wherein the areas of substantially constant brightness are determined by the processing system by analyzing whether the areas of substantially constant contrast are within a predetermined threshold of variance.

8. The system of claim 7, wherein the predetermined threshold of variance relates to values associated with bits representing the scanned signal and the stored signal.

9. The system of claim 1, wherein a search algorithm is employed to determine matching patterns of brightness changes between at least one signal within a CD-SEM field of view and at least one stored signal in memory.

10. A system for determining a shape of a feature, comprising:
    means for generating a signal associated with the feature;
    means for aligning the signal with a stored signal representing a known feature;
    means for determining whether the aligned signals have corresponding areas of substantially constant brightness; and
    means for determining whether the feature associated with the generated signal is similar to the known feature based on the substantially constant brightness determination by defining a set of reference points for the generated signal and the stored signal to enable an alignment of the signals, and wherein the set of reference points are determined from at least one of a high-to-low and low-to-high signal transition.

11. A CD-SEM system providing pattern recognition of a feature, comprising:
    a lens for directing electrons to the surface of the wafer;
    a detector for providing a first signal having a first contrast level based upon electrons received from the surface of a feature; and
    a processing system storing a second signal having a second contrast level;
    wherein the processing system is configured to determine the shape of the feature by positioning the first signal corresponding to the surface of the feature relative to the stored signal and comparing for regions of substantially constant brightness between the two signals,
    wherein the processing system is further configured to define a set of reference points for the first signal and the second signal to enable an alignment of the signals, and wherein the set of reference points are determined by the processing system from at least one of a high-to-low and low-to-high signal transition.

* * * * *